United States Patent [19]
Fulton

[11] 3,959,133
[45] May 25, 1976

[54] ALUM RECOVERY AND WASTE DISPOSAL IN WATER TREATMENT

[75] Inventor: George P. Fulton, Darien, Conn.

[73] Assignee: Metcalf & Eddy, Inc., New York, N.Y.

[22] Filed: Sept. 11, 1974

[21] Appl. No.: 505,067

[52] U.S. Cl. .................. 210/45; 210/67; 210/75; 423/132
[51] Int. Cl.² .......................... C02B 1/20
[58] Field of Search ............ 210/10, 43, 45, 47, 210/66, 67, 75, 81; 423/123, 128, 130, 132

[56] References Cited
UNITED STATES PATENTS

| | | | |
|---|---|---|---|
| 1,441,731 | 1/1923 | Mathis | 210/45 |
| 2,852,584 | 9/1958 | Komline | 210/66 |
| 3,279,603 | 10/1966 | Busse | 210/67 |
| 3,342,731 | 9/1967 | Baumann | 210/67 |

OTHER PUBLICATIONS

Fulton, "Alum Recovery for Filtration Plant," 1970, pp. 78–81, Water & Wastes Engineering.
Thomas, "Use of Filter Presses for the Dewatering of Sludges, WPCFJ, Jan., 1971, pp. 93–101.

Primary Examiner—Charles N. Hart
Assistant Examiner—Peter A. Hruskoci
Attorney, Agent, or Firm—Pennie & Edmonds

[57] ABSTRACT

In water treatment using alum and yielding a sludge containing aluminum hydroxide, alum is recovered by acidulating the sludge with sulphuric acid, conditioning the sludge with an inert additive for facilitating filtering, and supplying the conditioned sludge to a filter press. Alum in the filtrate is reused and make-up alum added as required. Periodically the cake in the filter press is neutralized with lime and disposed of. When the recovered alum becomes unsuitable for further use, the system is convertible to a sludge dewatering system in which acid is discontinued and lime added with the inert additive to condition the sludge for the filter press, the filtrate is returned to the water treatment system, and make-up alum is discontinued until all the stored recovered alum has been used up. New alum is then introduced and the sludge dewatering continued until the recovered alum has passed through the system and its coagulant product eliminated, the cake in the filter press being dumped as required. Then alum recovery may be resumed. Under unusual conditions where alum recovery might threaten the quality of the product water, the sludge dewatering mode of operation may be used until the conditions return to normal.

2 Claims, 3 Drawing Figures

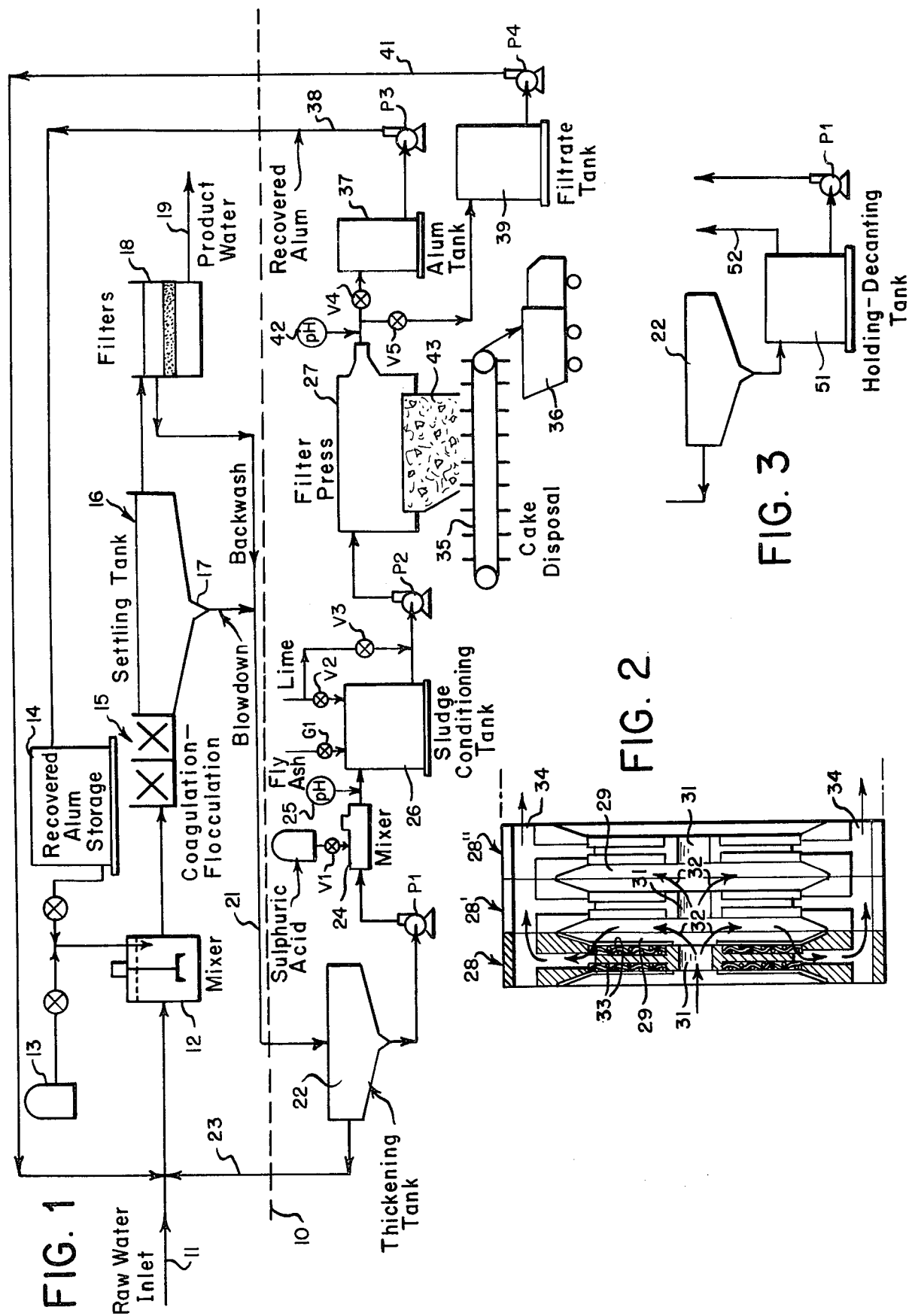

ALUM RECOVERY AND WASTE DISPOSAL IN WATER TREATMENT

BACKGROUND OF THE INVENTION

In water treatment plants, particularly for large municipalities, alum (aluminum sulphate) is commonly used in the coagulation and clarification process. During the treatment the alum is converted essentially to aluminum hydroxide. The aluminum hydroxide, together with suspended solids including suspended matter in the raw water, precipitates resulting from the treatment process, additives, etc. form a sludge which must be disposed of.

In the past waste products from the water treatment were simply discharged to the nearest body of water. With increasingly stringent anti-pollution standards, however, disposal is troublesome and expensive.

It has previously been proposed to dewater the waste sludge in a filter press, after suitable thickening and treatment with lime, thereby producing cake which can be trucked away and used for land fill, etc. With large amounts of waste, large filter press capacity is required, and new alum supplied as required for the treatment process.

Systems have also been described in which alum is recovered for re-use through acidulation of the aluminum hydroxide in the sludge. This permits recycling the recovered alum so that smaller amounts of new alum are required. Separation of the recovered alum solution from the remaining waste has been effected through the use of settling tanks, and the remaining waste drawn off and thereafter neutralized and dewatered.

During the period of recycling, the acidulation may resolubilize precipitates previously formed during the water treatment process. While there are probably many raw water mineral elements that would react in this manner, iron and manganese are likely to be of principal concern. As recycling proceeds, the iron and manganese accumulates in the recovered alum solution sufficiently to impair the water treatment or at least to become a potential problem. Other undesirable material may also gradually accumulate. It is therefore desirable to eliminate the recovered alum at intervals depending on the composition of the raw water and the treatment conditions, and start over with a new supply of alum.

It is also possible that, from time to time, undesirable wastes will appear in the raw water intake which, if retained in some form in the recycled alum solution, might threaten the quality of the product water. Such wastes might result from spills of industrial waste into the water source, extreme biological activity, flood wash-downs, etc. While likely to be of infrequent occurrence, it is prudent to take such conditions into account in the overall system since continuous operation is important in a municipal supply.

The present invention is directed to the provision of a water treatment system and process which normally utilizes alum recovery and yields a neutral cake for convenient disposal, provides for periodic elimination of contaminated recovered alum, and permits operation without alum recovery when required by abnormal conditions, with due regard to efficiency and cost considerations.

SUMMARY OF THE INVENTION

In accordance with the invention a convertible process is provided which is normally operated in an alum recovery mode, and can be converted to a straight sludge dewatering mode. A filter press is used in both modes of operation, and most of the other facilities are also used in both modes. Periodically, during the alum recovery mode, the acidulous cake in the filter press is neutralized and disposed of. In the sludge dewatering mode, the cake may also be removed periodically, but neutralization is unnecessary since it is chemically basic.

The process may be considered as having an alum recovery cycle during which alum used in the water treatment is recovered and reused, an end of run cycle during which the cake in the filter press is neutralized and dumped, and a straight dewatering cycle during which stored recovered alum is used up and new alum supplied to the system. In the latter cycle the cake may be dumped without neutralization.

During the alum recovery cycle, sludge from the water treatment system containing aluminum hydroxide is thickened, acidulated with sulphuric acid to produce alum from the hydroxide, and conditioned with an inert additive for facilitating filtering. The conditioned sludge is supplied under pressure to a filter press to produce a cake from the solids therein and a filtrate containing alum. The alum in the filtrate is then returned to the water treatment system for reuse. Although a high percentage recovery of alum is possible, it is unlikely to be 100% in practice and new make-up alum is added as required.

Periodically, as the filter press loads up, the system is switched to the end of run cycle. The supply of conditioned sludge to the filter press is discontinued and a neutralizing agent such as lime slurry passed through the filter press to neutralize the cake therein. When the cake has been sufficiently neutralized, it is dumped. The filtrate from the press is returned to the water treatment system.

Periodically, as the recovered alum solution becomes contaminated by undesired materials such as re-solubilized iron and manganese precipitates, the system is switched to the straight sludge dewatering cycle. The supply of acid to the sludge is discontinued, and the sludge conditioned with an inert additive and with lime for facilitating filtering. The conditioned sludge is then fed under pressure to the filter press. The filtrate is returned to the water treatment system and the filter cake periodically removed as required. During this cycle the supply of make-up alum is discontinued, or at least reduced, until all the stored recovered alum has been used up. Then fresh alum is supplied to the water treatment system and the cycle continued until sufficient time has elapsed for the coagulant products of the recovered alum to be eliminated from the system. Then the system can be switched back to the alum recovery cycle. During the sludge dewatering cycle, the filter press can be dumped as required.

Switching to the different modes of operation may be scheduled as determined by experience, and the schedules changed from time to time in accordance with changes in the composition of the raw water. It is also possible to monitor the inlet pressure to the filter press to determine when the cake therein should be removed, and the end of run cycle initiated.

Under unusual conditions where the alum recovery cycle might threaten the quality of the product water, the sludge dewatering cycle may be used until the conditions return to normal.

BRIEF DESCRIPTION OF THE DRAWINGS

FIG. 1 is a diagram illustrating apparatus for a convertible alum recovery and sludge dewatering process in accordance with the invention;

FIG. 2 is a sketch illustrating a portion of the filter press used in FIG. 1; and FIG. 3 is a detail of a modification of FIG. 1.

DESCRIPTION OF THE SPECIFIC EMBODIMENTS

In FIG. 1 the portions above the dash line 10 illustrate in simplified form a conventional water treatment system using alum and yielding a sludge containing aluminum hydroxide. Raw water from inlet line 11 is fed to mixer 12 which is supplied with new alum from tank 13, and normally with recovered alum from storage tank 14 as described later. The alum serves as a coagulant and clarifier, as is well known. The output of mixer 12 is fed to coagulation-flocculation tanks 15 and then to settling tank 16 having sludge wells indicated at 17. The overflow from tank 16 is fed to filters 18 which yield product water in output line 19. The backwash from plant 18 and the blowdown from wells 17 is a sludge containing aluminum hydroxide formed by the reaction of the alum with materials in the raw water, as well as suspended solids such as precipitates of iron and manganese and other additives (not indicated) used in the treatment process.

This sludge is fed through line 21 to apparatus below dash line 10 which can be operated for either alum recovery or sludge dewatering. Usually the sludge in line 21 is quite thin, say 0.5% solids under average operating conditions. Concentration is desirable to reduce the size and attendant costs of subsequent facilities for sludge conditioning and disposal. Accordingly the sludge in line 21 is supplied to thickening facilities here shown as a thickening tank 22. The overflow is returned through line 23 to the water treatment system for reprocessing.

The functioning of the apparatus below line 10 will first be described in the alum recovery mode of operation.

The underflow from tank 22 is a more concentrated sludge, say 2.0 percent solids or more, and is supplied by pump P1 to an in-line mixer 24 to which sulphuric acid is supplied through valve V1. Sufficient acid is supplied to accomplish substantially complete reaction of the aluminum hydroxide to form alum (aluminum sulphate), with some excess if required to satisfy the reaction with other constituents in the sludge and to lower the pH of the resulting mixture. Meter 25 may be used to monitor the pH value. The acidulated sludge is then supplied to a conditioning tank 26 in which it is mixed with an inert additive for facilitating subsequent filtering and cake formation. Fly ash has been found suitable, and is supplied to the tank through gate G1. The tank is sufficiently large to provide a suitable detention period for conditioning, say a minimum of 30 minutes. The conditioned sludge is supplied by a high pressure pump P2, say 100 to 200 psi, to a filter press 27. During the alum recovery cycle valves V2 and V3 are closed so that lime is not used.

FIG. 2 is a cross-sectional detail illustrating a portion of a filter press suitable for the purpose. The filter press has a number of plates depending on the required capacity, and three plates 28–28'' are here shown. During filtering, the plates are pressed together in the positions shown, by hydraulic or mechanical means. The faces of each plate are recessed to form chamber 29 into which sludge flows from central inlet passages 31 as indicated by arrows 32. Each plate face is covered with a filter cloth as shown at 33, and the filtrate passing therethrough goes to a common outlet conduit through openings 34 in abutting areas of the plates. As sludge is pumped under pressure into the assembled filter press, cake forms on the filter cloths and ultimately fills chambers 29. A high degree of dewatering is accomplished by the high pumping pressure utilized. As the cake forms in the chambers the inlet pressure rises, and when it reaches a predetermined pressure indicating a full press or desired end of the run, the feed of sludge to the press is stopped and the plates are separated to allow the densely formed cake to fall onto suitable cake disposal equipment, here shown as a conveyor belt 35 emptying into a truck 36.

Returning to FIG. 1, during the alum recovery cycle the filtrate in press 27 contains alum in solution. Valve V4 is open to feed the alum solution to a pump supply tank 37, and valve V5 is closed. Pump P3 returns the recovered alum through line 38 to the storge tank 14 for use in water treatment, and make-up alum is supplied from tank 13 as required.

When the inlet pressure to filter press 27 indicates end of run, the alum recovery cycle is temporarily discontinued and the cake in the press is first neutralized and then dumped. To this end the supply of acidulated sludge to the filter press is discontinued by stopping pump P1. Valves V1 and V4 are closed and gate G1 closed. Pump P3 may be turned off. Valve V3 is opened to supply lime slurry through pump P2 to the filter press 27. P2 may be turned off until valve V3 is open, and then turned on again. As the lime slurry passes through the filter press it neutralizes the cake therein and valve V5 is opened to deliver the filtrate to tank 39.

It is desirable to return the filtrate to the water treatment system for reprocessing, to avoid loss of water. However, the initial filtrate to tank 39 may contain considerable alum which has not been neutralized, and hence should not be returned directly to the raw water inlet. If tank 39 is large enough to contain all the filtrate involved in neutralizing the cake, pump P4 may be turned on at the end of the neutralization to return the filtrate through line 41 to the raw water inlet. Or, if desired, the filtrate during the end-of-run cycle could be returned to the holding-decanting tank of FIG. 3, to be described later.

When the cake has been sufficiently neutralized, as indicated by the pH of the filtrate measured by meter 42, valve V3 is closed and pump P2 stopped. The neutralized cake is then dumped onto conveyor belt 35 as indicated at 43 and carted away. The plates of the press are then pressed together and the alum recovery cycle begins again. To this end, valve V5 is closed and pump P4 stopped, and the system returned to the condition described above for alum recovery.

Eventually, after a number of alum recovery cycles depending on the condition of the raw water and the water treatment process, undesired materials will accumulate in the recovered alum solution in alum storage tank 14 to a point where it is desirable to dispose of the recovered alum and start anew with fresh alum. When this point is reached, the system is converted to a straight sludge dewatering operation where the aluminum hydroxide is removed as a solid with the cake discharge from the filter press.

For this sludge dewatering cycle valve V1 is closed to discontinue the supply of acid, and thickened sludge from tank 22 supplied to conditioning tank 26 by pump P1. Gate G1 is open to supply fly ash to the tank, and valve V2 is opened to supply lime to the tank. The lime serves as a coagulant to agglomerate fine particles and aids the subsequent filtering, as is known. Pump P2 supplies the conditioned sludge to the filter press under high pressure as before. Valves V3 and V4 are closed, the latter stopping flow of filtrate to alum tank 37. Pump P3 may remain on until tank 37 is empty and then turned off, or left off if the volume of tank 37 is small compared to that of storage tank 14. Valve V5 is opened and pump P4 turned on to return the filtrate from press 27 to the inlet of the water treatment system.

During this sludge dewatering cycle fresh alum from tank 13 may be shut off until all the recovered alum in tank 14 has been used up. Then new alum from tank 13 is used for a sufficient length of time to insure that all the recovered alum has passed through the system and its coagulant products eliminated. From time to time, as pressure in the filter press builds up, supply of conditioned sludge to the press may be temporarily cut off and the cake dumped.

When all the recovered alum has been used up, the operation may be switched back to the alum recovery cycle, and the supply of new alum reduced to make-up quantities.

Inasmuch as the facilities used in alum recovery handle acid solutions and solids, they should be made of acid-resistant materials. These include mixer 24, tank 26, pumps P2 and P3, the filter press 27, tank 37 and the connecting lines. However, during the alum recovery the hydroxide portions of the solids in the sludge are converted to alum and resolubilized, so that substantially less solids need to be removed in the form of cake from the filter press. Hence smaller filter press facilities suffice during alum recovery.

During simple sludge dewatering more solids need to be removed, and additional facilities may be provided and switched into use during this cycle of operation.

Referring to FIG. 3, instead of supplying thickened sludge from tank 22 to acid mixer 24 as in FIG. 1, the sludge may be fed to an intermediate holding-decanting tank 51. The sludge in tank 51 is pumped by P1 to mixer 24, and the supernatant liquid returned through line 52 to the raw water inlet for retreatment. As mentioned above, the filtrate from press 27 during the end of run cycle may be fed to tank 51 rather than to tank 39, suitable lines and valves (not shown) being provided.

It should be understood that exact neutralization of the cake in filter press 27 at the end of run during alum recovery is not essential, so long as the aciduous cake is sufficiently neutralized to avoid excessive damage to the subsequent handling facilities and to be suitable for land fill or other disposal.

By using a filter press during the alum recovery cycle the intimate contact of the acid with the cake as it forms promotes a highly efficient alum recovery under normal operating conditions. Also, during the end of run cycles during alum recovery the flow of lime slurry through the aciduous cake promotes effective neutralization. In addition, since the filter press is used during both alum recovery and sludge dewatering cycles, a highly dewatered cake can be formed which can be disposed of readily.

It will be understood that the facilities for large water treatment systems may become quite elaborate, and that the facilities shown in the drawings may be expanded and adapted to the requirements of the particular application.

I claim:

1. In a raw water treatment system in which alum is added to the water undergoing treatment and followed by steps including coagulation-flocculation, settling and filtering to produce product water, the treatment resulting in a sludge containing aluminum hydroxide, the improvement which comprises
   A. recovering alum from said sludge and reusing the alum by steps comprising
      1. acidulating the sludge with sulphuric acid to produce alum from the aluminum hydroxide therein,
      2. conditioning the acidulated sludge with an inert additive for facilitating filtering,
      3. supplying the conditioned sludge under pressure to a filter press to produce a cake from the solids therein and a filtrate containing alum, and
      4. returning alum in the filtrate to said water treatment system;
   B. interrupting the steps of (A) as said filter press loads up and neutralizing and removing cake from the filter press by steps comprising
      1. discontinuing the supply of acidulated conditioned sludge to the filter press,
      2. supplying a lime slurry under pressure to the filter press to neutralize the cake therein,
      3. returning the filtrate from the filter press to said water treatment system, and
      4. removing the neutralized cake from the filter press; and
   C. interrupting the steps of (A) and (B) as the recovered alum becomes undesirably contaminated and substantially eliminating recovered alum products from the system by steps comprising
      1. discontinuing the supply of acid to the sludge,
      2. conditioning the sludge with an inert additive and with lime for facilitating filtering,
      3. supplying the conditioned sludge under pressure to said filter press,
      4. returning the filtrate from the filter press to the water treatment system, and
      5. removing the cake from the filter press.

2. A process according to claim 1 in which the steps in (A) include returning the recovered alum to a storage tank for use along with new make-up alum in said water treatment system, and in which the steps in (C) include reducing the supply of new alum to the water treatment system until the recovered alum in the storage tank has been substantially used up, and then using new alum in the water treatment system until products of the recovered alum have been substantially eliminated from the system.

* * * * *